Patented Apr. 16, 1935

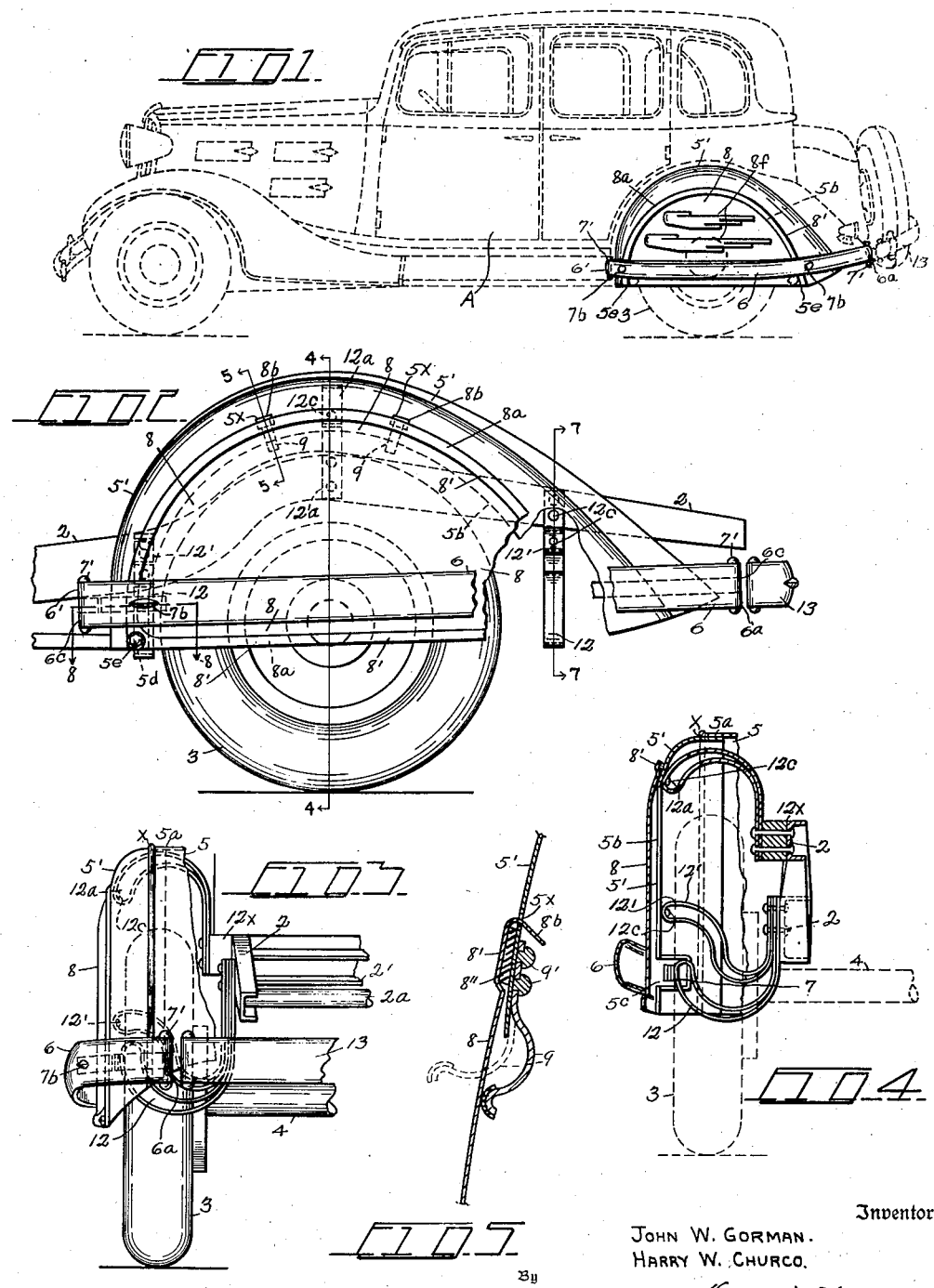

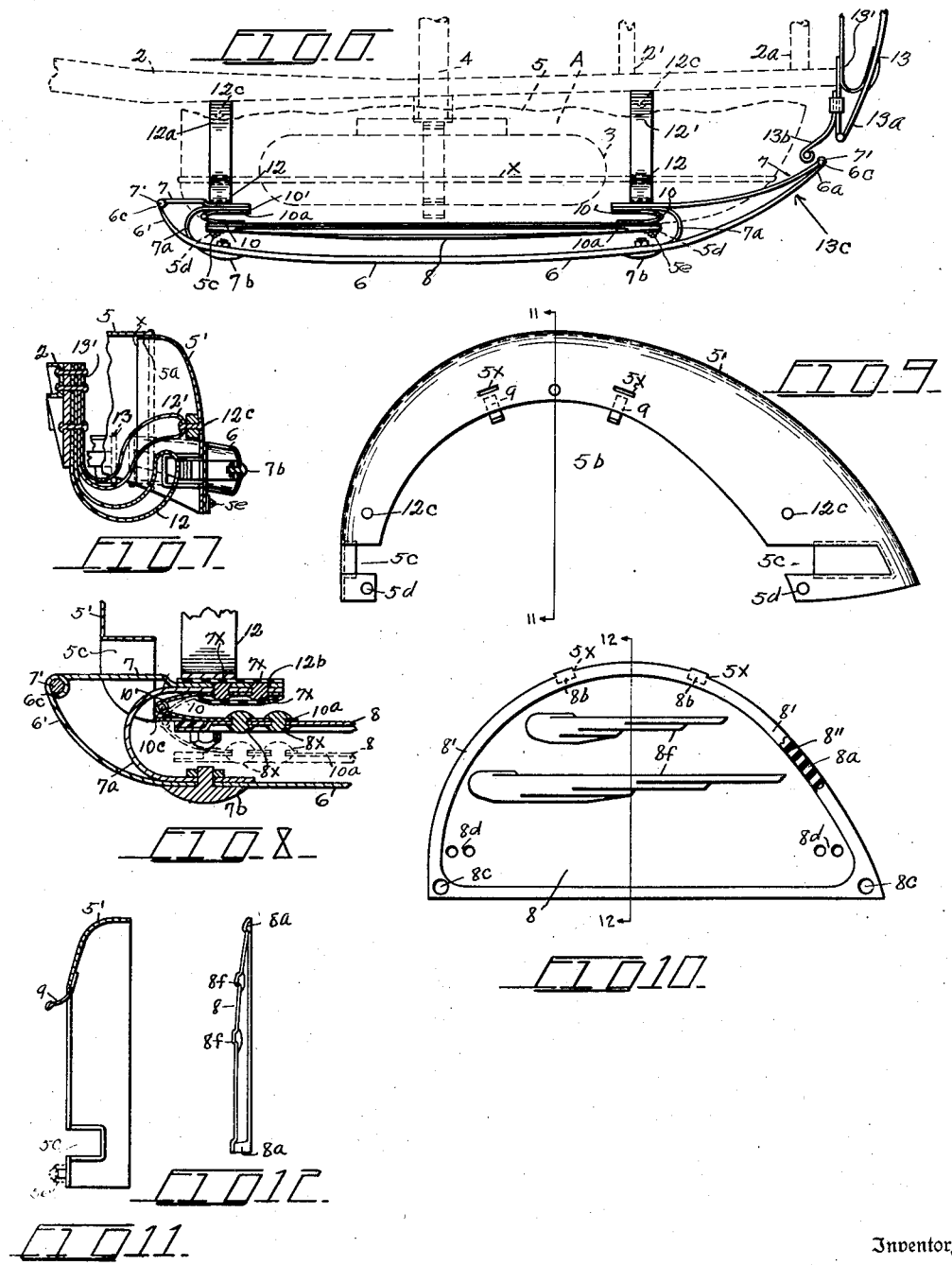

1,998,134

UNITED STATES PATENT OFFICE 1,998,134

SIDE BUMPER FOR VEHICLES

John W. Gorman and Harry W. Churco, Lakewood, Ohio

Application January 30, 1935, Serial No. 4,117

8 Claims. (Cl. 293—57)

This invention relates to bumpers designed for protecting the rear wheels, mud-guards and the adjacent portions of automobiles and other vehicles, and has for its object to provide a bumper mechanism which is adapted to absorb all shocks which ordinarily would damage or disfigure the rear wheels and their fenders; the bumpers comprising stout narrow bars of slightly resilient metal, which are mounted horizontally outside of and substantially in the plane of the axes of the wheels; the said bumpers and certain related parts being so arranged as to be readily and quickly mounted or demounted as a single unit in order to permit the removal of the wheels, as well as the changing of the tires. A further object is to provide semi-circular sheet metal shields to close the usual semi-circular openings in the mud-guards or fenders, that ordinarily expose the upper halves of and, renders the wheels liable to be broken or otherwise damaged, by colliding objects that strike above the bumper bars. A further object is to provide novel and effective buffer means for the bumpers and shields, which may be disposed between the chassis frame and the outer rims of the mud-guards or fenders, to deaden and absorb the jars and shocks due to side collisions, skidding, and/or side-wipings of the vehicles; the said shock absorbing means including relatively stiff independent upper and lower buffer springs, preferably of goose-neck type, which are permanently secured to the chassis frame; the bumper bars being supported directly, and suitably cushioned by, means of resilient flat semi-rigid connection members that are joined by contact only with the lowermost series of buffer springs which are normally under sufficient compression to prevent vibration or rattle; the nature of the latter connections being such as to enable the bumper to float or move bodily inwardly towards the chassis and goose-neck springs under all impacts delivered to the bumper bars. The semi-circular shields also join with the said connections and are detachably mounted upon the outer rolled faces of the shield rims in registry with the semi-circular openings, and to which the shields may be detachably interlocked by simple means; the top inner rims of the wheel fenders being constantly in engagement with the upper series of buffer springs, and the corresponding portions of the shields also being under normal tension produced by spaced semi-elliptical springs which are supported by said rim portions ready to absorb the impacts or shocks that may be delivered above the bumper bar without danger of the shields buckling or otherwise giving way.

We attain these objects by the means set forth in the detailed description which follows, and as illustrated by the accompanying drawings, in which—

Figure 1 is a side view of an automobile to which the bumper mechanism is applied. Fig. 2 is an enlarged broken side elevation of one of the rear wheels and bumper. Fig. 3 is a rear elevation of the said wheel. Fig. 4 is a central vertical cross-section, taken on line 4—4 of Fig. 2. Fig. 5 is enlarged vertical cross-section, taken on line 5—5 of Fig. 2, showing one of a pair of semi-elliptical springs that are disposed adjacent the slots of the rim. Fig. 6 is an enlarged top plan, partially in shadow of the complete bumper mechanism. Fig. 7 is a reversed broken side elevation and partial vertical cross-section of one of the rear bumpers. Fig. 8 is a broken horizontal section, taken on line 8—8 of Fig. 2, showing the bumper and shield in relation to the flat connections. Fig. 9 is a side elevation of the separable mud-guard rim. Fig. 10 is a front elevation of the shield that closes the opening in said rim. Fig. 11 is a vertical cross-section, taken on line 11—11 of Fig. 9. And Fig. 12 is a vertical cross-section, taken on line 12—12 of Fig. 10.

In the drawings, A represents generally an automobile; 2 is the chassis frame, and 3 is one of the rear wheels which is supported and driven by an axle 4. 5 represents one of the old style rear mud-guards which has been modified by cutting away its outside roll substantially on the line X in Figs. 3, 4 and 6, and substituting therefor a shield rim 5' of special design to facilitate applying the present rear side bumpers to standardized automobile equipment. The facing edges of the sections 5—5' of the modified guard are preferably arranged to telescope, as shown at 5a in Figs. 3 and 4, and may assume different positions relatively to each other when the rim 5' is subjected to different degrees of pressure or thrust. The lower ends of the shield rim 5' are formed with aligning channels 5c, and the inner lower corners of said rim are fitted with fixed bolt shanks 5d (see Figs. 9 and 11) and nuts 5e for the attachment of other parts.

6 represents the rear left bumper comprising a somewhat flexible metal bar, which is preferably made from channel stock, and may be disposed edgewise horizontally of the wheel 3, as shown in Figs. 1, 2, 3 and 6. The bumper 6 is preferably longer than the span of the arc-shaped rim 5', and its ends 6'—6a taper and curve inwardly and terminate in eyes or loops 6c, as shown in Figs. 2, 3 and 6, for effecting glancing blows when the automobile is in collisions with other vehicles or objects. The bumper 6 is supported mainly by semi-rigid flat spring metal connecting members 7, which are disposed horizontally behind and in the plane of the bumper; the ends of said bumper and the members 7 being hingedly joined by pintels 7', in order to allow said parts to flex freely under varying degrees of compression; the bumpers 6 and members 7 being spaced and reinforced by horse-shoe-shaped resilient flat members 7a, and the parts 6, 7 and 7a being permanently held in place respectively by a bolt 7b and a series of rivets 7x. The connecting members 7—7a are preferably disposed in registry with the aligning horizontal channels 5c of the shield rim 5' in the common plane of the bumper and said members. The members 7—7a when at rest normally extend an inch or two into the channels 5c, which tend to guide and hold said parts constantly in said plane. By the provision of the channels 5c, the bumper 6 and its connecting and supporting members 7a—7 may be disposed several inches closer to the hub of the wheel 3, and thereby avoid unduly increasing the overall breadth of the vehicle. The channels 5c are preferably of such depth as to permit the free flexing and horizontal floating of the bar 6 and connections 7—7a when subjected to the severest blows, and said channels also facilitate the removal of the main bumper mechanism as a single unit, without disturbing the shield rim 5', or any of the buffer springs carried by the chassis frame.

8 represents the semi-circular wheel shield, hereinafter called the shield, that overlies and closes the semi-circular opening, as 5b, common to the rear mud-guards of auto vehicles, and consists of a substantially flat and stiff plate of sheet metal, whose diameter is slightly greater than that of said opening, and overlaps the inner curved edge of the shield rim 5'. The peripheral and bottom edges of the plate or shield 8 are preferably offset or raised, as at 8', for stiffening said edges and providing a pocket or groove 8a to receive rubber or other insulation (shown only at 8'' in Figs. 5 and 10). The top edge of the shield 8 is formed with integral radial tongues, which may be bent into rearwardly facing hooks 8b that are passed through slots 5x of the rim 5', to detachably interlock said parts, as shown in Figs. 2, 5, 10 and 12. The lower corners of the shield 8 are preforated, as at 8c, to receive the bolt shanks 5d that are rigid to the lower corners of the rim 5' (see Figs. 9 and 10). The shield 8 and shield rim 5', are joined near their top ends by means of the hooks 8b and semi-elliptical springs 9, whose top ends are bolted to the rim 5', as at 9' in Fig. 5, in which the lower end of one of said springs is shown in frictional contact with the rear face of shield 8, and is at compression, which indicates that the lower end of said shield is bolted tightly to the rim 5', and is held in place by the nuts 5e. When the nuts 5e are removed, the lower end of shield 8 will spring outwardly to the extent of the flexing of springs 9, as shown by the full and dotted lines in Fig. 5, and permits the hooks 8b to be withdrawn from the slots 5x.

In the present case, the resilient buffer means relied upon principally to absorb the shocks and blows transmitted by the bumper bar 6, shield rim 5' and related parts, are preferably in the form of goose-necks, because of their structural simplicity and ability to withstand repeated flexings for longer periods than the common coiled type of springs in common use. The goose-neck springs are preferably arranged in two series, the lower springs, as 12, which absorb the shocks transmitted by the bumper bar 6, and the upper springs 12' and 12a, that absorb shocks transmitted by the medial and upper portion of the rim, and all of said goose-necks are preferably permanently mounted upon the chassis frame 2, as shown in Figs. 3 and 4. The springs 12 have their outer or free ends in frictional engagement or contact with the inner face of the flat connection 7, which is directly back of the bumper bar 6, to facilitate removal of the main parts without hindrance, while the springs 12'—12a have their outer ends secured by anchor bolts 12c to the fender rim 5' (see Figs. 2, 3, 4, 7 and 8). The buffers 12 are adapted to absorb the shocks directed against the adjacent outer face of said rim. The upper goose-neck 12a, which is inverted as compared with the springs 12—12', to avoid contact with the wheel 3, connects by an anchor bolt 12c to the upper central portion of the rim 5'. By this arrangement of the several goose-neck springs, all shocks directed against the bumper 6, rim 5' and shield 8, will be transmitted and distributed substantially equally to all of the goosenecks and prevent injury to the rear wheels of the vehicle. The goosenecks 12 and 12' are preferably positioned forwardly and rearwardly of the wheel 3, there being no centrally disposed lower goosenecks due to interference by the wheel. The gooseneck 12a is located at the extreme upper center of the rim 5' above and clear of the top of the wheel, its shank being separated from the chassis by a spacing block 12x, as shown in Figs. 3 and 4. The shield 8 and bumper 6 are joined forwardly and rearwardly of the wheel 3 by means of the flat connections 7—7a and semi-elliptical springs 10, whose members 10' and 10a are hingedly connected by pins 10c and are disposed between one arm of the horseshoe-shaped member 7a and the shield 8, said parts being clamped and rigidly held in place respectively by rivets 7x and 8x, the latter rivets engaging holes 8d shown near the opposite lower corners of the shield 8 (see Figs. 8 and 10). When the shield 8 is interlocked to rim 5' by the hooks 8b and the shield is swung downwardly to engage the bolt shanks 5d and secured by tightening up the nuts 5e, the springs 10 and connected and related parts are moved, as from the dotted position to the full line position, in Fig. 8. This effects the normal compresson of springs 10 against the lower goosenecks 12 (see Figs. 6 and 8), which remains constant until shocks due to collisions again force the bumper connections 7—7a, the springs 10 and the bumper farther inwardly against the goosenecks 12, and effect the absorption of the shocks, as described. The connection members 7 are preferably separated from the goosenecks 12 by rubber insulation, as 12b (see Fig. 8).

The present bumper system in reality comprises two separate shock-absorbing units, so connected together as to be applied and removed as a single unit, while each functions independently of the other when struck; the shield 8, in conjunction with the feeder rim 5', which is independently connected by the three gooseneck springs, 12' and 12a, to the chassis frame, acts as one unit, while the bumper bar 6 which bears against the separate goosenecks, as 12, acts as the other unit. The shield 8 and bar 6 are joined by means of the flat connections 7—7a and the semi-elliptical springs 10 to the back of the shield 8 when said shield is bolted tightly against the lower corners of the rim 5', these semi-elliptical springs being then at compression and forcing the flat bumper connections tightly against the respective goosenecks (see Figs. 4, 6 and 8), thus preventing vibrations and rattle. If the blow be delivered against the bar 6, it is transmitted by the members of the flat semi-rigid connections 7—7a to the lowermost goosenecks 12. Should a blow be delivered above the bumper bar 6, against the shield 8, or rim 5', it is transmitted directly to the upper goosenecks 12'—12a, while the compression on the spring 10 may be somewhat increased. Owing to the flexible nature of the several connections 7—7a and 10, as described, the bumper bar 6 is given a slight floating range horizontally, which enables said bar to adjust itself in different directions, to prevent cramping, undue strains, or disfigurement when struck by other vehicles or objects.

The connections 7—7a and springs 10 that connect with shield 8 are duplicated at or near the opposite ends of the bumper 6, but are not thus shown except in miniature in Fig. 6. The loose rear ends of the chassis frame 2 are preferably tied together by the transverse rods 2'—2a, for stiffening the resistance of said ends when shocks are delivered against the bumper 6, rim 5' and shield 8, as shown in Figs. 3 and 6. The shield 8 may be embossed as shown at 8f in Figs. 1 and 10, to give it additional strength to resist heavy shocks by the employment of relatively thin gauge metal. Means may be provided for relieving the strain at the rear of the bumper bar 6, in case a blow should be delivered near its end 6a, by partially transferring the shock to the corresponding rear bumper, as 13 (see showing at the right of Fig. 6), which is fastened at 13' to the rear end of the chassis frame 2, and includes a semi-elliptical spring 13a which is fitted with a short stiff auxiliary buffer spring 13b, that is disposed in the path of the side bumper, and resists the shocks delivered in the direction of the arrow 13c in Fig. 6.

Having thus described our invention, what we claim is—

1. A floating side bumper comprising a bar mounted horizontally across the rear wheel of a vehicle in the plane of the axis of the wheel, resilient means connected with the bar and extending towards the chassis, and buffer means carried by the chassis facing and contacting with the bar connections adapted to absorb shocks transmitted by the bar and said connections.

2. In a side bumper for rear wheels of vehicles, a bar disposed horizontally in the plane of the axis of the wheel, resilient means connected with and supporting said bar extending towards the chassis in the plane of said axis, and buffer means supported by the chassis and frictionally engaging the bumper connections adapted to absorb shocks transmitted by the bar and said connections.

3. A floating side bumper comprising a bar mounted horizontally across the rear wheel of a vehicle in the plane of the axis of the wheel, a mud-guard having an outer rolled rim formed with aligning channels that register with the bar, resilient means connected with the bar and extending into and guided by said channels, and buffer means carried by the chassis facing and contacting with the bar connections adapted to absorb shocks transmitted by the bar and said connections.

4. A bumper for the rear wheels of auto vehicles comprising a bar disposed horizontally in the plane of the axis of the wheel, a mud-guard supported by the body of the vehicle having a separable outer rolled rim portion formed with an opening concentric to the wheel, a shield to close said opening, means to interlock the shield to said rim, said rim having aligning channels in registry with said bar, resilient connections to support said bar normally disposed in said channels, and buffer means carried by the chassis joined with said connections and said rim and adapted to absorb shocks transmitted by said bar, said shield and said rim.

5. In a side bumper for vehicles, a circular wheel guard rim disposed between the bumper and chassis frame having an opening concentric to the wheel, a shield adapted to be interlocked with the rim to close said opening, resilient flat connections secured to and supporting the bumper, a series of buffer springs mounted upon the chassis and having their outer ends made fast to the inner face of the guard rim to absorb shocks delivered to said rim above the bumper, and a series of buffer springs supported by the rim and exerting pressure to enable the shield to withstand blows struck against its outer face.

6. A bumper for the rear wheels of auto vehicles comprising a bar disposed horizontally in the plane of the axis of the wheel, a mud-guard including a separable outer rolled rim having an opening concentric to the wheel supported by the body of the vehicle, a shield overlying and closing said opening, means to interlock the top and bottom of said shield to the adjacent portions of the rim, the lower ends of the rim being formed with horizontal aligning channels that face outwardly and register with the bumper bar, resilient connections disposed in said channels and directly supporting the bumper bar, buffer springs carried by the chassis and joined by contact with said resilient connections adapted to absorb shocks transmitted by the bumper, said connections and said shield, and said bumper, shield and connections adapted to be removed as a single unit by the releasing of said interlocking means.

7. A floating side bumper for the rear wheels of auto vehicles adapted to be moved bodily in the plane of the axis of the wheel when struck by another vehicle or object, said bumper being supported by resilient connections that extend inwardly towards the chassis, buffer means carried by the chassis and contacting the said connections adapted to absorb shocks delivered to the bumper and transmitted to said connections, a mud-guard comprising an outer rolled rim having an opening concentric to said axis, a shield overlapping said rim and closing said opening, said shield being permanently joined to said connections and adapted to partially compress said buffer means when the shield is interlocked with the rim, and said bumper, said shield, and said connections adapted to be removed from the wheel as a single unit by the releasing of said interlocking means.

8. A bumper for the rear wheels of vehicles comprising a bar disposed horizontally across the axis of the wheel, a mud-guard comprising an outer rolled rim having an opening concentric to the wheel, a semi-circular shield overlying and closing said opening, means to interlock the top and bottom of the shield to said rim, resilient connections directly supporting said bar extending inwardly towards the chassis, a series of buffer springs supported by the chassis in frictional contact with said connections adapted to be normally held at compression by the interlocking of the shield ready to absorb shocks transmitted by the bumper to said buffer springs, and a second series of buffer springs positively joined to said rim and adapted to absorb shocks delivered to the shield and rim.

JOHN W. GORMAN.
HARRY W. CHURCO.